(12) United States Patent
Chen et al.

(10) Patent No.: US 7,847,217 B2
(45) Date of Patent: *Dec. 7, 2010

(54) HOT-MELTING METHOD WITH SIMULTANEOUS HEATING AND COOLING OF WORKPIECES

(75) Inventors: Shun-Ho Chen, Tu-Cheng (TW); Li-Pei Huang, Chu-Nan (TW); Tzyy-Chyi Tsai, Tu-Cheng (TW); Yun-Hsiang Chuang, Chu-Nan (TW); Chin-Hsien Tsai, Shindian (TW)

(73) Assignees: Hon Hai Precision Industry Co., Ltd., Tu-Cheng, Taipei Hsien (TW); Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 815 days.

This patent is subject to a terminal disclaimer.

(21) Appl. No.: 11/636,317

(22) Filed: Dec. 8, 2006

(65) Prior Publication Data
US 2008/0053616 A1 Mar. 6, 2008

(30) Foreign Application Priority Data
Aug. 18, 2006 (CN) .................. 2006 1 0062202

(51) Int. Cl.
*B29C 65/02* (2006.01)
*B29C 65/18* (2006.01)
*F25B 29/00* (2006.01)
*B32B 37/00* (2006.01)
*B32B 41/00* (2006.01)

(52) U.S. Cl. .................. 219/388; 219/243; 165/65; 156/358; 156/359; 156/344; 156/583.1

(58) Field of Classification Search .................. None
See application file for complete search history.

(56) References Cited

U.S. PATENT DOCUMENTS

| 2,694,131 | A | * | 11/1954 | Carson | 219/215 |
| 3,355,876 | A | * | 12/1967 | Oettinger et al. | 59/22 |
| 3,991,927 | A | * | 11/1976 | Napor et al. | 228/41 |
| 6,146,134 | A | * | 11/2000 | Kresak et al. | 432/121 |
| 7,357,288 | B2 | * | 4/2008 | Hosotani et al. | 228/6.2 |
| 2002/0047003 | A1 | * | 4/2002 | Bedingham et al. | 219/388 |

FOREIGN PATENT DOCUMENTS

| JP | 51041059 A | * | 4/1976 |
| JP | 10278106 A | * | 10/1998 |
| KR | 704614 B1 | * | 4/2007 |

* cited by examiner

*Primary Examiner*—Joseph M Pelham
(74) *Attorney, Agent, or Firm*—Jeffrey T. Knapp

(57) ABSTRACT

An exemplary hot-melting method includes the following steps. A hot-melting machine (20) is provided. The hot-melting machine includes a rotatable worktable (23), a heater (25), at least one cooler (26), and a plurality of carriers located on the worktable and being uniformly spaced apart. A first workpiece loaded on a first one of the carriers is cooled using the at least one cooler. Simultaneously, a second workpiece loaded on a second one of the carriers is heated using the heater.

17 Claims, 8 Drawing Sheets

HOT-MELTING METHOD WITH SIMULTANEOUS HEATING AND COOLING OF WORKPIECES

CROSS-REFERENCE TO RELATED APPLICATION

This application is related to two co-pending U.S. patent Applications, a co-pending U.S. patent application Ser. No. 11/636,319, filed on Dec. 8, 2006, entitled "COOLING MOLD WITH GAS GROOVES", and a co-pending U.S. Patent Application Ser. No. 11/636,318, filed on Dec. 8, 2006, "HOT-MELTING MACHINE WITH ROTATABLE WORKTABLE" respectively. Such applications have the same assignee as the instant application and have been concurrently filed herewith.

TECHNICAL FIELD

The present invention generally relates to a hot-melting method used in the manufacture of workpiece units, each of which has two or more workpieces affixed together by hot-melt adhesive.

BACKGROUND

With ongoing development in manufacturing technologies, hot-melting machines are now in widespread use in many industries. A hot-melting machine is configured for heating two or more workpieces affixed together by hot-melt adhesive in order to obtain a workpiece unit.

Referring to FIG. 6, a typical hot-melting machine 10 is shown. The hot-melting machine 10 includes a worktable 11 and a controller 12. The worktable 11 includes a raised support platform 13. A heater 14 and a cooler 15 are attached to the support platform 13. The heater 14 includes a first actuator 141, and a heating device 142 disposed at a bottom end of the first actuator 141. The cooler 15 includes a second actuator 151, and a cooling device 152 disposed at a bottom end of the second actuator 151. A guide rail 16 is disposed on the worktable 11 under the support platform 13. The worktable 11 further includes a carrier 17 and a driving mechanism 18. The driving mechanism 18 is configured for driving the carrier 17 to slide along the guide rail 16. The controller 12 is configured for controlling the heater 14, the cooler 15, and the driving mechanism 18 to move.

Referring also to FIG. 7, the cooling device 152 is substantially a rectangular plate. The cooling device 152 includes a protrusion 1521. A recessed cooling portion 1522 is formed in the protrusion 1521 according to a desired shape of a workpiece unit. A plurality of through vents 1523 are defined in a top of the cooling portion 1522. The through vents 1523 run through the cooling mold 152.

Referring also to FIG. 8, a hot-melting method using the hot-melting machine 10 includes the following steps. A workpiece is affixed to another workpiece by a hot-melt adhesive, thereby forming a workpiece unit. The workpiece unit is loaded on the carrier 17. The driving mechanism 18 drives the carrier 17 to move along the guide rail 16 under control of the controller 12 until the workpiece unit is aligned with the heater 14. The first actuator 141 drives the heating device 142 to move down toward the workpiece unit under control of the controller 12 until the heating device 142 abuts against the workpiece unit for heating. When a heating process for the workpiece unit is finished, the first actuator 141 drives the heating device 142 to move up and separate from the workpiece unit and return to its original position. The driving mechanism 18 drives the carrier 17 to move along the guide rail 16 until the workpiece unit is aligned with the cooler 15. The second actuator 151 drives the cooling device 152 to move down toward the workpiece unit under control of the controller 12 until the cooling device 152 abuts against the workpiece unit for cooling. Gas provided by a gas-compressor is pumped into the cooling device 152 via the through vents 1523 for cooling the workpiece unit. When a cooling process for the workpiece unit is finished, the second actuator 151 drives the cooling device 152 to move up and return to its original position. The driving mechanism 18 drives the carrier 17 to move back along the guide rail 16 to return to its original position. Finally, the workpiece unit is unloaded from the carrier 17.

In the above-described hot-melting method, the heater 14 and the cooler 15 do not run simultaneously. Therefore the efficiency of processing of workpiece units is limited.

Thus a new hot-melting method is desired in order to overcome the above-described shortcomings.

SUMMARY

An exemplary hot-melting method includes the following steps. A hot-melting machine is provided. The hot-melting machine includes a rotatable worktable, a heater, at least one cooler, and a plurality of carriers located on the worktable and being uniformly spaced apart. A first workpiece loaded on a first one of the carriers is cooled using the at least one cooler. Simultaneously, a second workpiece loaded on a second one of the carriers is heated using the heater.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hot-melting method. Moreover, in the drawings, like reference numerals designate corresponding parts throughout various views.

DETAILED DESCRIPTION OF THE EMBODIMENTS

Figure 1:
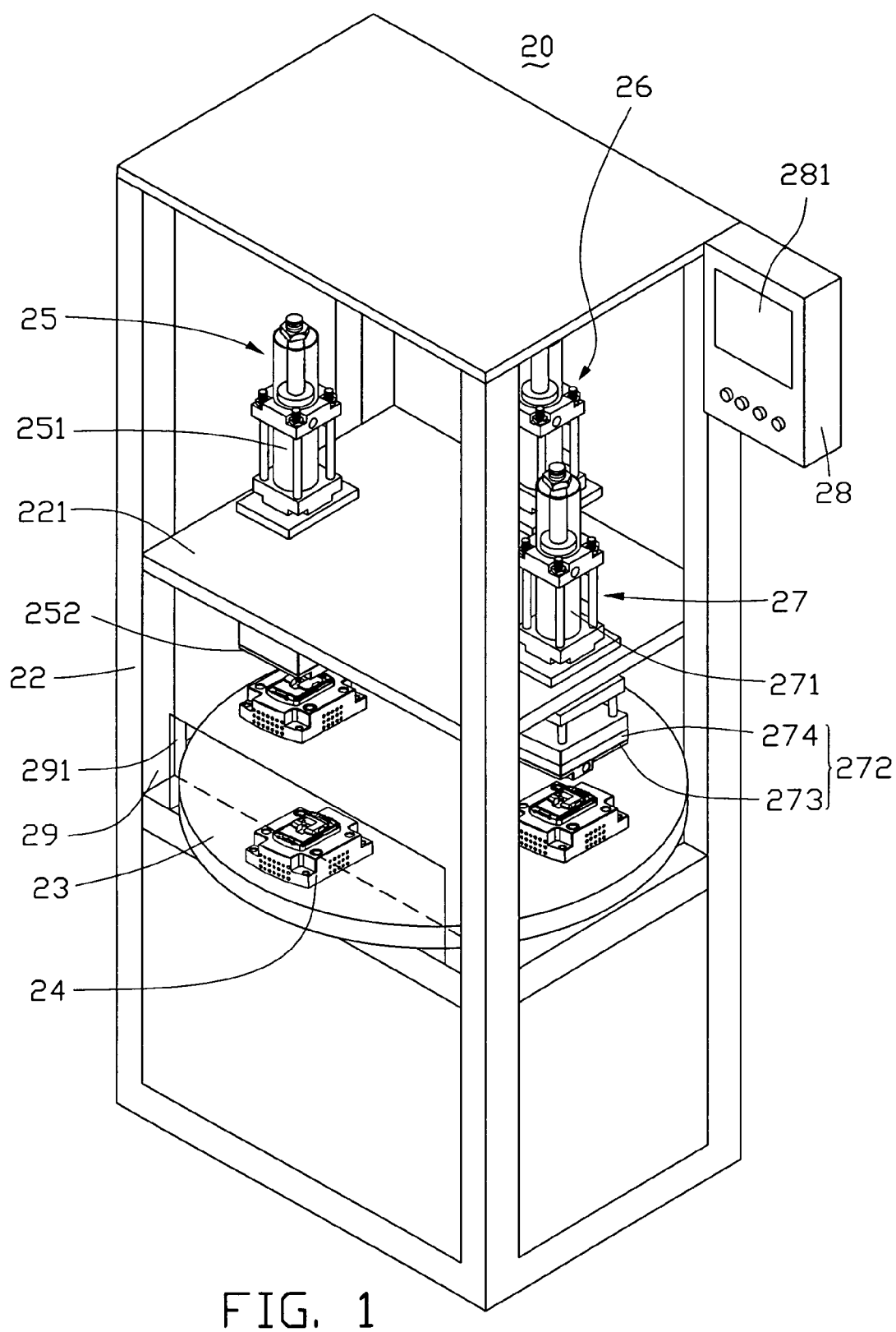
FIG. 1 is an isometric view of an exemplary hot-melting machine used in a hot-melting method in accordance with a preferred embodiment of the present invention.

Referring now to the drawings in detail, FIG. 1 shows an exemplary hot-melting machine 20 used in a hot-melting method in accordance with a preferred embodiment of the present invention. The hot-melting machine 20 includes a frame 22, a worktable 23, at least three carriers 24, a heater 25, a first cooler 26, a second cooler 27, and a controller 28. In the illustrated embodiment, there are four carriers 24, which are disposed on the worktable 23.

The frame 22 includes a support platform 221. The support platform 221 is substantially a rectangular board, and is configured for supporting the heater 25, the first cooler 26, and the second cooler 27.

The worktable 23 is substantially a round board. The worktable 23 is rotatably disposed in the frame 22 beneath the support platform 221.

The carriers 24 are located on a periphery of the worktable 23, and are uniformly spaced apart. The carriers 24 include a first carrier (not labeled), a second carrier (not labeled), a third carrier (not labeled), and a fourth carrier (not labeled), arranged in that order in a counterclockwise direction. Each carrier 24 is configured for holding a workpiece unit (not shown). A shape of each carrier 24 corresponds to that of the workpiece unit.

Figure 2:
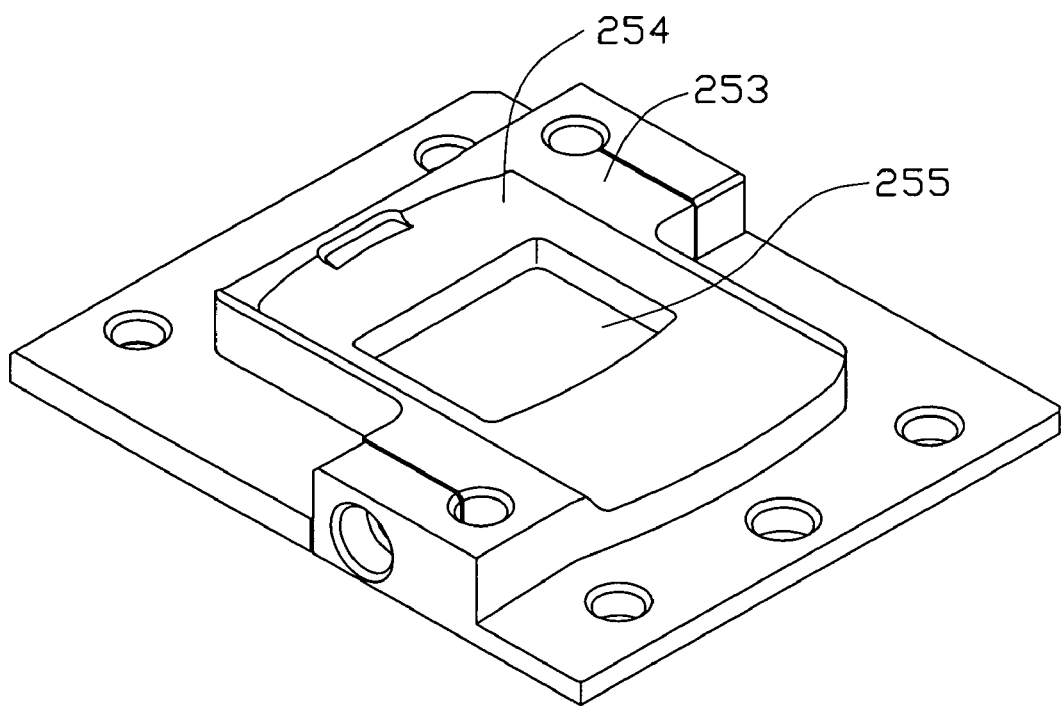
FIG. 2 is an enlarged, inverted isometric view of a heating device of a heater of the hot-melting machine of FIG. 1.

Referring also to FIG. 2, the heater 25 is attached to the support platform 221. The heater 25 includes a heater actuator 251, and a heating device 252 disposed at a bottom end of the heater actuator 251 beneath the support platform 221. The heater actuator 251 is configured for driving the heating device 252 to move down and up. The heating device 252 is configured for heating the workpiece unit. The heating device 252 includes a protrusion 253. A recessed heating portion 254 is formed in the protrusion 253 according to the shape of the workpiece unit. The heating device 252 further includes a recess 255 defined in a top of the heating portion 254. In an alternative embodiment, the recess 255 of the heating device 252 can be omitted.

Figure 3:
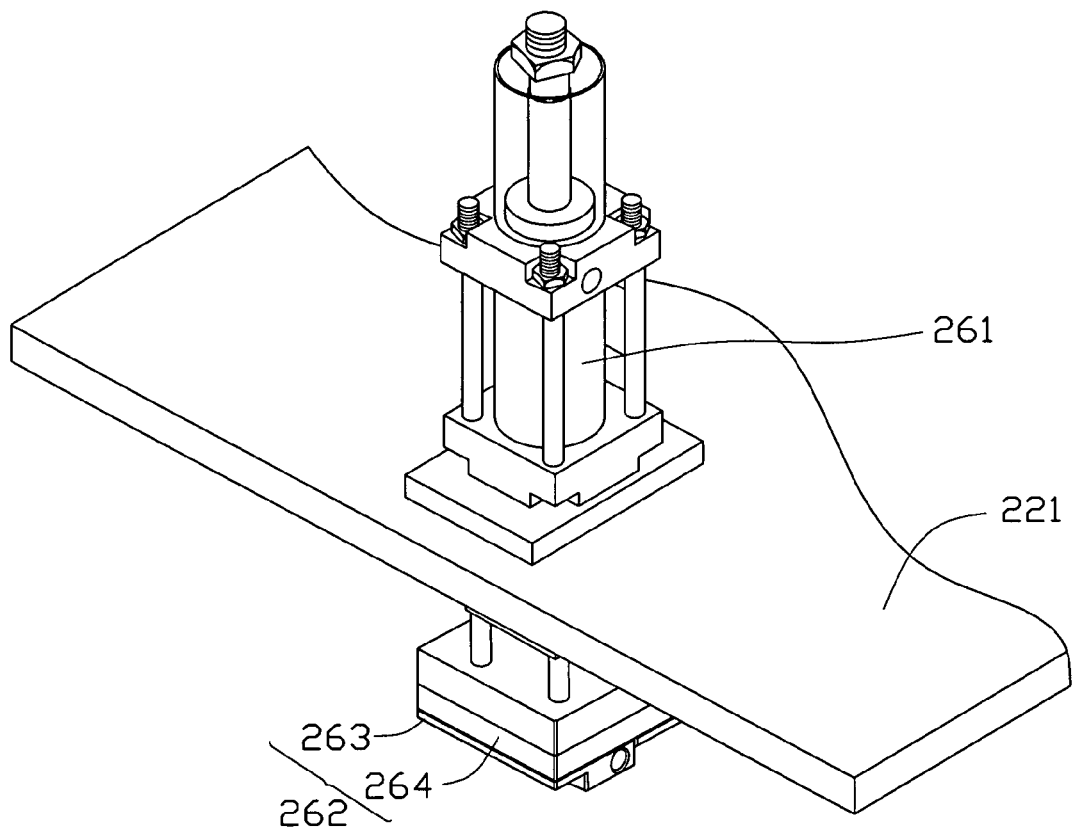
FIG. 3 is an enlarged, isometric view of one of coolers of the hot-melting machine of FIG. 1.
Figure 4:
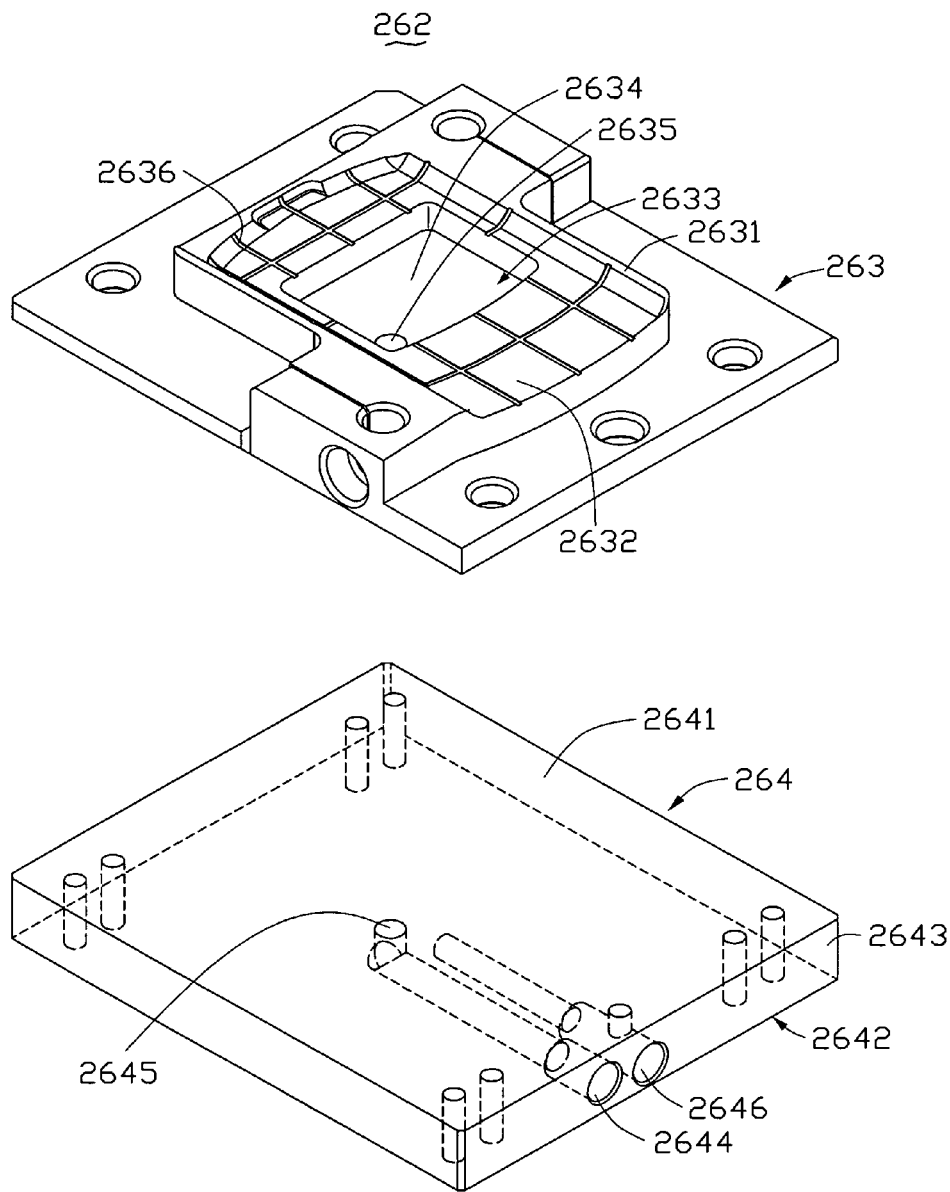
FIG. 4 is an enlarged, exploded, inverted isometric view of a cooling device of the cooler of FIG. 3.

Referring to FIGS. 1, 3 and 4, the first cooler 26 is attached to the support platform 221. The first cooler 26 includes a first cooler actuator 261, and a first cooling device 262 disposed at a bottom end of the first cooler actuator 261 beneath the support platform 221. The first cooler actuator 261 is configured for driving the first cooling device 262 to move down and up. The first cooling device 262 is configured for cooling the workpiece unit. The first cooling device 262 includes a cooling mold 263 and a fastening plate 264. The fastening plate 264 connects the cooling mold 263 to the first cooler actuator 261.

The cooling mold 263 is substantially a rectangular plate, and includes a protrusion 2631. A recessed cooling portion 2632 is formed in the protrusion 2631. The cooling portion 2632 has a shape corresponding to the shape of the workpiece unit. The cooling mold 263 further includes a recess 2633 defined in a top of the cooling portion 2632. The recess 2633 has a top surface 2634. In these respects, the cooling mold 263 is similar to the heating device 252 described above. However, the cooling mold 263 further includes at least one output vent 2635 defined at the top surface 2634 of the recess 2633. The at least one output vent 2635 runs through the cooling mold 263. In the illustrated embodiment, there is only a single output vent 2635. The cooling portion 2632 further defines a plurality of intersecting channels 2636 in the top and sides thereof. At least one of the channels 2636 communicates with the recess 2633.

The fastening plate 264 is substantially a rectangular plate, and is configured for engaging with the cooling mold 263. The fastening plate 264 includes a lower surface 2641, an upper surface 2642 opposite to the lower surface 2641, and four side surfaces 2643 interconnecting the lower surface 2641 and the upper surface 2642. The lower surface 2641 of the fastening plate 264 is oriented to be adjacent to the cooling mold 263. The fastening plate 264 includes an input vent 2644 defined at one of the side surfaces 2643. The input vent 2644 is bent, and an inner portion thereof defines a transfer vent 2645 that is exposed at the lower surface 2641. When the fastening plate 264 engages with the cooling mold 263, the transfer vent 2645 communicates with the output vent 2635. The input vent 2644, the transfer vent 2645 and the output vent 2635 cooperatively form an input duct (not labeled) communicating with the channels 2636, for passage of gas that is pumped into the first cooling device 262 via the input vent 2644. The fastening plate 264 further defines a measuring duct 2646 at one of the side surfaces 2643. In the illustrated embodiment, the measuring duct 2646 and the input vent 2644 are defined at the same side surface 2643. The measuring duct 2646 is configured for receiving a thermometer (not shown). The thermometer measures a temperature of the first cooling device 262, so as to obtain an indication of a temperature of the workpiece unit.

In alternative embodiments, the cooling mold 263 can be integrated with the fastening plate 264 as a single piece. The recess 2633 of the cooling mold 263 of the first cooler 26 can be omitted. In such case, the output vent 2635 of the cooling portion 2632 can directly communicate with at least one of the channels 2636 of the cooling mold 263. The input vent 2644 of the fastening plate 264 can be defined at the upper surface 2642, with the input vent 2644 running through the fastening plate 264.

The second cooler 27 is substantially the same as the first cooler 26. The second cooler 27 is attached to the support platform 221. The second cooler 27 includes a second cooler actuator 271, and a second cooling device 272 disposed at a bottom end of the second cooler actuator 271 beneath the support platform 221. The second cooler actuator 271 is configured for driving the second cooling device 272 to move down and up. The second cooling device 272 includes a cooling mold 273 and a fastening plate 274. The fastening plate 274 secures the cooling mold 273 to the second cooler actuator 271.

The controller 28 is configured for driving the worktable 23 to rotate. The controller 28 is also configured for driving the actuators 251, 261, and 271 to move down toward the carriers 24 and up away from the carriers 24. The controller 28 includes a display device 281. The display device 281 is configured for displaying and setting various parameters; for example, a rotational speed of the worktable 23, a distance of movement of the heater actuator 251, a distance of movement of the first cooler actuator 261, a distance of movement of the second cooler actuator 271, etc.

The hot-melting machine 20 also includes a gas-compressor (not shown). The gas-compressor is configured for providing gas to the first cooler 26 and the second cooler 27.

The hot-melting machine 20 further includes a plurality of sensors (not shown). The sensors are attached to the heater 25, the first cooler 26, and the second cooler 27. Each of the sensors is configured for detecting the presence of a workpiece unit on a corresponding one of the carriers 24, and signaling the controller 28 accordingly.

The hot-melting machine 20 still further includes a pair of transparent protection panels 29. The protection panels 29 are disposed in two sides of the frame 21 adjacent to the heater 25, and are configured for separating the heater 25 from the surrounding environment. The protection panel 29 at one of the sides of the frame 21 defines an opening 291. At any one time, one of the carriers 24 on the worktable 23 can protrude through the opening 291. This enables convenient loading and unloading of a workpiece unit onto or from the carrier 24.

When the first carrier protrudes through the opening 291, the second carrier is aligned with the second cooler 27, the third carrier is aligned with the first cooler 26, and the fourth carrier is aligned with the heater 25.

Figure 5:
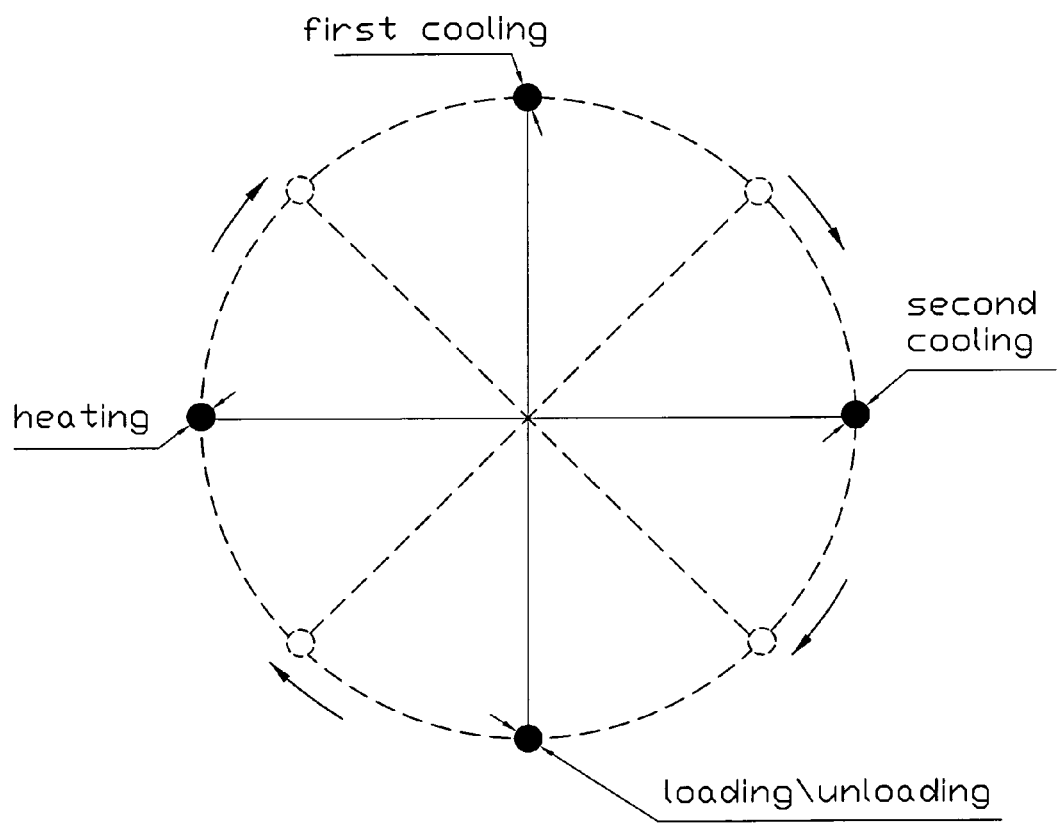
FIG. 5 is a flow chart of the hot-melting method of the preferred embodiment.
Figure 6:
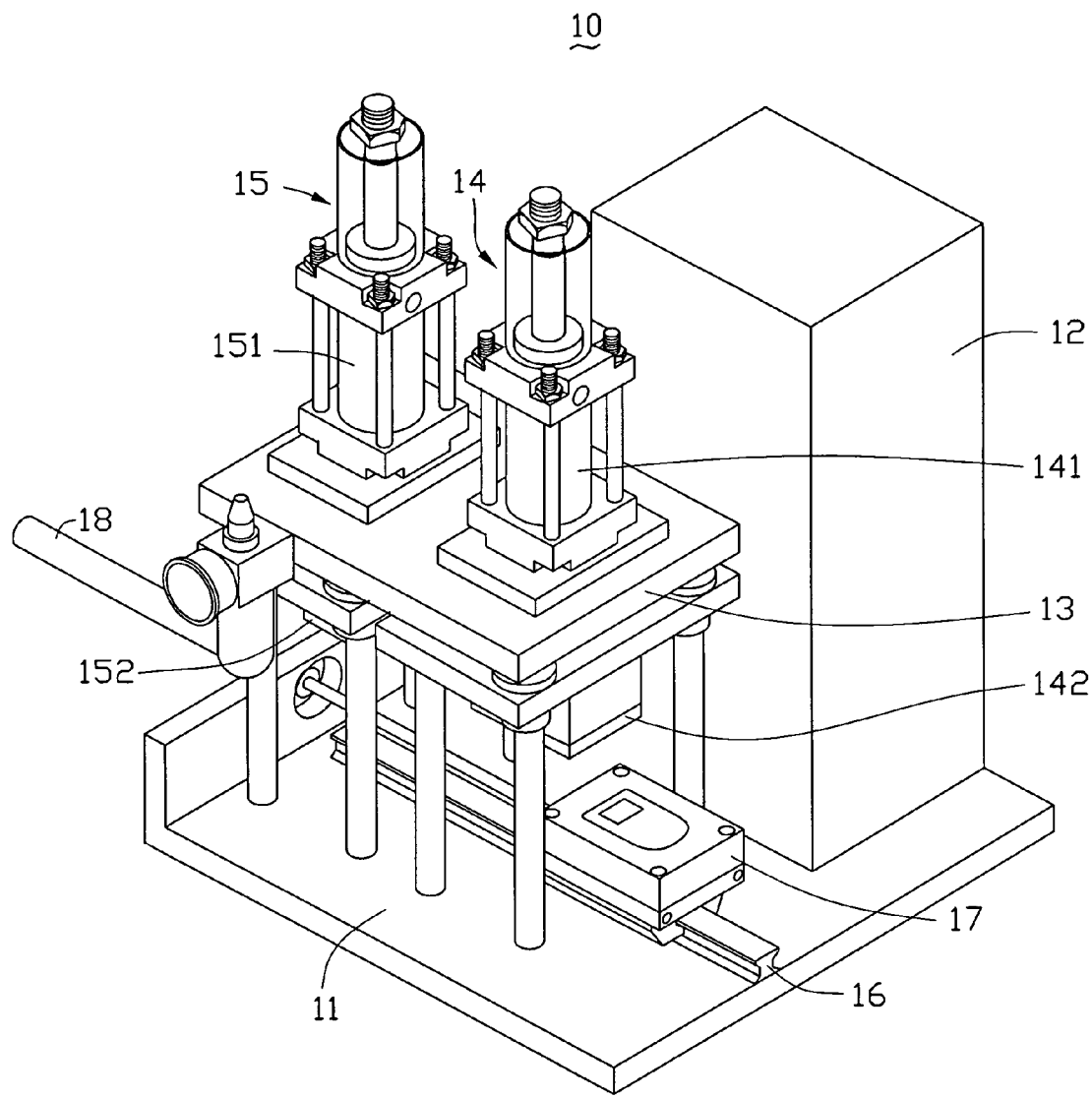
FIG. 6 is an isometric view of a conventional hot-melting machine.
Figure 7:
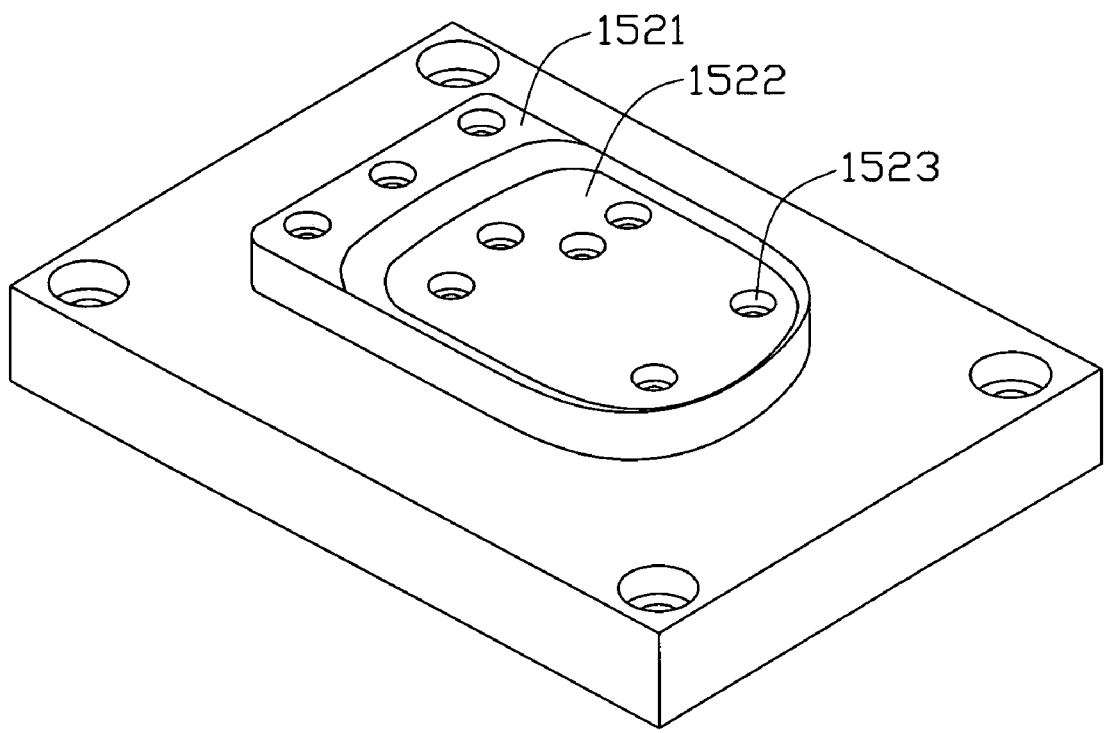
FIG. 7 is an enlarged, inverted isometric view of a cooling device of a cooler of the hot-melting machine of FIG. 6.
Figure 8:
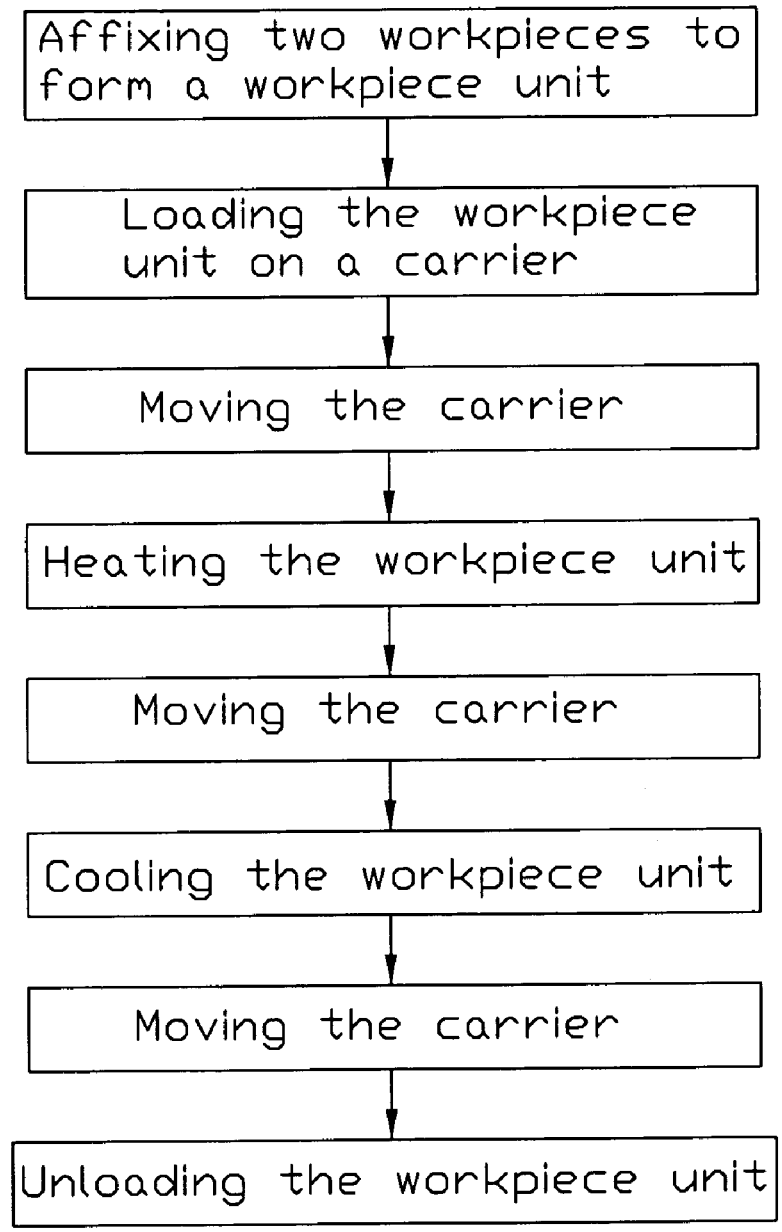
FIG. 8 is a flow chart of a conventional hot-melting method using the hot-melting machine of FIG. 6.

Referring also to FIG. 5, the exemplary hot-melting method includes the following steps. The hot-melting machine 20 is provided. The worktable 23 is rotated until the first carrier protrudes through the opening 291. In this position, the second carrier is aligned with the second cooler 27, the third carrier is aligned with the first cooler 26, and the fourth carrier is aligned with the heater 25. The sensor on the second cooler 27 detects the presence of a second workpiece unit on the second carrier, the sensor on the first cooler 26 detects the presence of a third workpiece unit on the third carrier, and the sensor on the heater 25 detects the presence of a fourth workpiece unit on the fourth carrier. The sensors then signal the controller 28 accordingly.

The controller 28 drives the heater actuator 251 to move toward the fourth workpiece unit. The heater actuator 251 drives the heating device 252 to move down toward the fourth workpiece unit until the heating portion 254 abuts against the fourth workpiece unit for heating. At the same time, the controller 28 drives the first cooler actuator 261 to move toward the third workpiece unit. The first cooler actuator 261 drives the cooling mold 263 to move down toward the third workpiece unit until the cooling portion 2632 abuts against the third workpiece unit for a first cooling process. Gas provided by the gas-compressor is pumped into the first cooling device 262 via the input duct (not labeled) and the channels 2636 to cool the third workpiece unit. The controller 28 drives the second cooler actuator 271 to move toward the second workpiece unit. The second cooler actuator 271 drives the cooling mold 273 to move down toward the second workpiece unit until the cooling mold 273 abuts against the second workpiece unit for a second cooling process. A first workpiece unit is loaded on the first carrier.

When the heating process for the fourth workpiece unit is finished, the heater actuator 251 drives the heating device 252 to move up and separate from the fourth workpiece unit and return to its original position. When the first cooling process for the third workpiece unit is finished, the first cooler actuator 261 drives the cooling mold 263 to move up and return to its original position. When the second cooling process for the second workpiece unit is finished, the second cooler actuator 271 drives the cooling mold 273 to move up and return to its original position. The worktable 23 rotates clockwise until the second carrier having the second workpiece unit protrudes through the opening 291, the first carrier having the first workpiece unit is aligned with the heater 25, the fourth carrier having the fourth workpiece unit is aligned with the first cooler 26, and the third carrier having the third workpiece unit is aligned with the second cooler 27. That is, an angle through which the worktable 23 is rotated is equal to an angle between any two adjacent carriers 24. Then the corresponding sensors detect the presence of the first workpiece unit, the second workpiece unit, and the third workpiece unit on the first carrier, the second carrier, and the third carrier respectively. The sensors then signal the controller 28 accordingly.

The controller 28 drives the heater actuator 251 to move toward the first workpiece unit. The heater actuator 251 drives the heating device 252 to move down toward the first workpiece unit until the heating portion 254 abuts against the first workpiece unit for heating. At the same time, the controller 28 drives the first cooler actuator 261 to move toward the fourth workpiece unit. The first cooler actuator 261 drives the cooling mold 263 to move down toward the fourth workpiece unit until the cooling portion 2632 abuts against the fourth workpiece unit for a first cooling process. The controller 28 drives the second cooler actuator 271 to move toward the third workpiece unit. The second cooler actuator 271 drives the cooling mold 273 to move down toward the third workpiece unit the cooling mold 273 abuts against the third workpiece unit for a second cooling process. The second workpiece unit is unloaded from the second carrier. Another workpiece unit is loaded on the second carrier, and a next cycle of operation of the hot-melting method begins.

In the above-described hot-melting method, the worktable 23 rotates according to the above-described cyclical operation. At each stage, the four carriers 24 respectively correspond to a loading/unloading step, a heating step, a first cooling step, and a second cooling step. The four steps run simultaneously, whereby operation of the hot-melting machine 20 is efficient.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hot-melting method, comprising:
    providing a hot-melting machine, the hot-melting machine comprising a rotatable worktable, a heater, at least one cooler, and a plurality of carriers located on the worktable and being uniformly spaced apart, wherein the at least one cooler comprises an actuator and a cooling device disposed at a bottom end of the actuator, the actuator is capable of driving the cooling device to move down and up, and the cooling device is capable of cooling workpieces and comprises a cooling mold and a fastening member, the fastening member connects the cooling mold to the actuator, the cooling mold comprises a protrusion, and the protrusion defines a gas output vent and a plurality of intersecting channels communicating with the at least one gas output vent; and
    cooling a first workpiece loaded on a first one of the carriers using the at least one cooler, and simultaneously heating a second workpiece loaded on a second one of the carriers using the heater.

2. The hot-melting method as claimed in claim 1, further comprising rotating the worktable until the second workpiece loaded on the second carrier is aligned with the at least one cooler.

3. The hot-melting method as claimed in claim 2, wherein an angle through which the worktable is rotated is equal to an angle between any two adjacent carriers.

4. The hot-melting method as claimed in claim 2, further comprising unloading the first workpiece from the first carrier.

5. The hot-melting method as claimed in claim 1, further comprising loading a third workpiece on a third one of the carriers.

6. The hot-melting method as claimed in claim 5, further comprising rotating the worktable until the second workpiece loaded on the second carrier is aligned with the at least one cooler and the third workpiece loaded on the third carrier is aligned with the heater.

7. The hot-melting method as claimed in claim 6, further comprising unloading the first workpiece from the first carrier.

8. The hot-melting method as claimed in claim 1, wherein the heater comprises a heater actuator and a heating device disposed at a bottom end of the heater actuator, the heater actuator is capable of driving the heating device to move down and up, and the heating device is capable of heating the first and second workpieces.

9. The hot-melting method as claimed in claim 1, wherein the gas output vent runs through the cool mold, the fastening member defines a gas input vent, and the gas input vent and the gas output vent cooperatively form a duct configured for passage of cooling gas therethrough.

10. The hot-melting method as claimed in claim 9, wherein the cooling mold defines a recess and a plurality of channels, the recess has a top surface, the gas output vent is defined at the top surface of the recess, and at least one of the channels communicates with the recess.

11. The hot-melting method as claimed in claim 9, wherein the fastening member is generally rectangular, and comprises an upper surface, a lower surface, and four side surfaces between the upper surface and the lower surface, and the lower surface is adjacent to the cooling mold.

12. The hot-melting method as claimed in claim 11, wherein the gas input vent is defined at one of the side surfaces of the fastening member, and runs through to the lower surface of the fastening member.

13. The hot-melting method as claimed in claim 1, further comprising unloading a third workpiece from a third one of the carriers.

14. The hot-melting method as claimed in claim 13, wherein the hot-melting machine further comprises a frame having a support platform, and the heater and the at least one cooler are attached to the support platform.

15. The hot-melting method as claimed in claim 14, wherein the hot-melting machine further comprises a protection panel, the protection panel is disposed in a side of the frame proximate to the heater, the protection panel defines an opening, and the third carrier protrudes through the opening.

16. A hot-melting method, comprising:
    providing a hot-melting machine, the hot-melting machine including a rotatable worktable, a heater, at least one cooler, and at least three carriers located on the worktable and being uniformly spaced apart, wherein the at least one cooler comprises an actuator and a cooling device disposed at a bottom end of the actuator, the actuator is capable of driving the cooling device to move down and up, and the cooling device is capable of cooling workpieces and comprises a cooling mold and a fastening member, the fastening member connects the cooling mold to the actuator, the cooling mold comprises a protrusion, and the protrusion defines at least one gas output vent and a plurality of intersecting channels communicating with the at least one gas output vent;
    cooling a first workpiece loaded on a first one of the carriers using the at least one cooler, and simultaneously heating a second workpiece loaded on a second one of the carriers using the heater;
    unloading a third workpiece from a third one of the carriers, and loading a fourth workpiece on the third carrier;
    rotating the worktable until the second workpiece loaded on the second carrier is aligned with the at least one cooler and the fourth workpiece loaded on the third carrier is aligned with the heater;
    cooling the second workpiece loaded on the second carrier using the at least one cooler, and simultaneously heating the third workpiece loaded on the third carrier using the heater;
    unloading the first workpiece from the first carrier, and loading a fifth workpiece on the first carrier; and
    repeating corresponding of the above-described cooling, heating, unloading, loading, and rotating actions a desired number of times in respect of the second, fourth, fifth and a desired number of subsequent workpieces until all the workpieces have been unloaded from their corresponding carriers.

17. The hot-melting method as claimed in claim 16, wherein the at least one cooler is two coolers, and the at least three carriers is four carriers.

* * * * *